United States Patent [19]

Frazier

[11] 4,220,462
[45] Sep. 2, 1980

[54] APPARATUS FOR MAKING A VACUUM INSULATED CONTAINER

[75] Inventor: Albert A. Frazier, Nashville, Tenn.

[73] Assignee: Aladdin Industries, Incorporated, Chicago, Ill.

[21] Appl. No.: 918,438

[22] Filed: Jun. 23, 1978

Related U.S. Application Data

[60] Division of Ser. No. 522,445, Nov. 11, 1974, abandoned, which is a continuation of Ser. No. 261,424, Jun. 9, 1972, abandoned.

[51] Int. Cl.² .................... C03B 23/16; C03B 23/20
[52] U.S. Cl. .................................. 65/153; 65/270; 228/19
[58] Field of Search .................. 65/153, 34, 58, 270, 65/156, 157, 40, 42; 29/455 R; 228/221, 19

[56] References Cited

U.S. PATENT DOCUMENTS

| | | | |
|---|---|---|---|
| 1,056,971 | 3/1913 | Coleman | 65/34 |
| 1,388,126 | 8/1921 | Rohland | 65/58 X |
| 1,436,197 | 11/1922 | Rohland | 65/153 |
| 2,684,777 | 7/1954 | Danzin et al. | 65/58 X |
| 3,232,732 | 2/1966 | Wax | 65/58 X |
| 3,749,562 | 7/1973 | Nicolas et al. | 65/270 X |

FOREIGN PATENT DOCUMENTS

| | | | |
|---|---|---|---|
| 382753 | 10/1923 | Fed. Rep. of Germany | 65/153 |
| 1255030 | 11/1971 | United Kingdom | 65/34 |

Primary Examiner—Richard V. Fisher

[57] ABSTRACT

A vacuum insulated container is constituted by a double-walled receptacle wherein the space between the walls is substantially evacuated to provide vacuum insulation. The outer wall is provided with an opening therein which is used during manufacture to provide access to the space between the walls so that the space may be evacuated. A stopper- or plug-like portion fills the opening after the container has been evacuated and is permanently joined or bonded to the surfaces of the opening thereby providing a sealing to maintain the vacuum in the space between the walls. The apparatus and method of manufacturing such a container include means for and the steps of: forming the opening by piercing the outer wall; providing a sealed chamber in which the container may be placed on a movable support after a sealing element is placed on the opening; evacuating the chamber; heating the container in the vicinity of the opening with the sealing element resting therein; and deforming the sealing element to cause it to completely seal the opening and bond to the container wall after it has been heated to a temperature permitting the material to flow.

6 Claims, 12 Drawing Figures

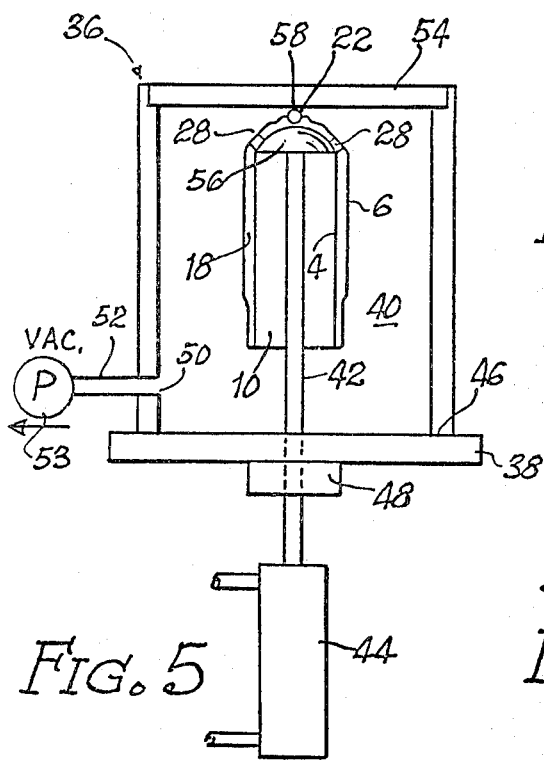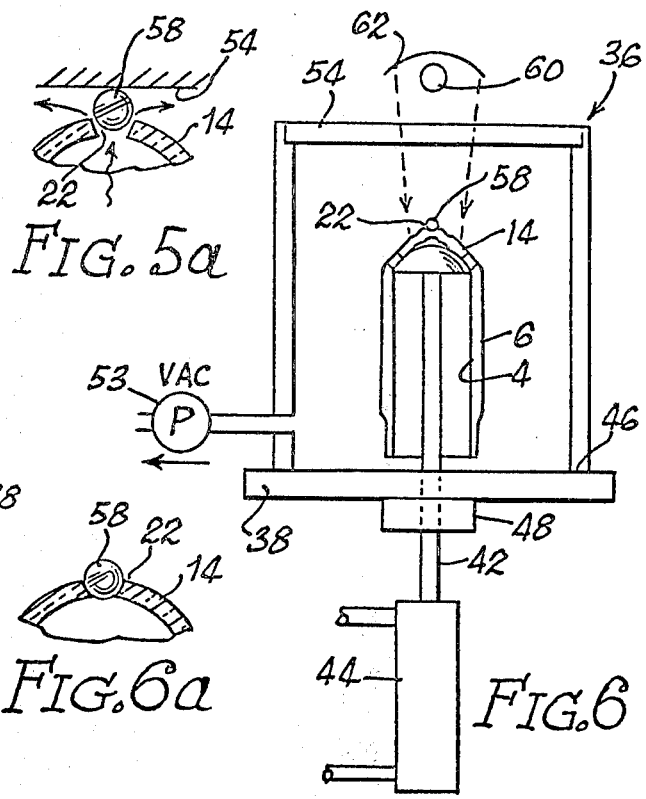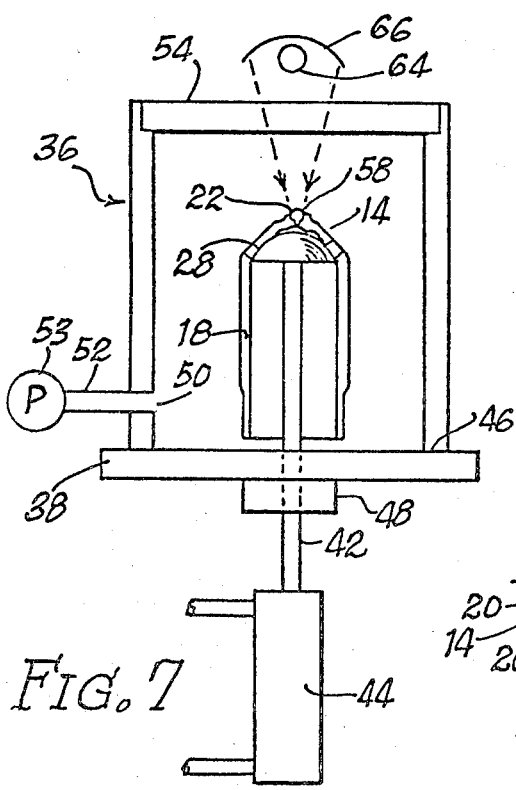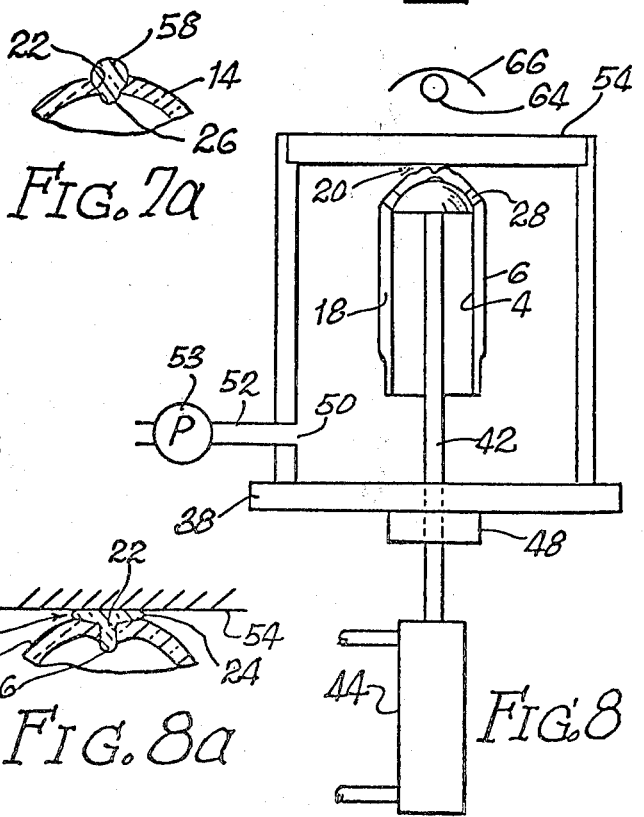

APPARATUS FOR MAKING A VACUUM INSULATED CONTAINER

This application is a division of application Ser. No. 522,445, filed Nov. 11, 1974, now abandoned, which is a continuation of Ser. No. 261,424, filed June 9, 1972, now abandoned.

BACKGROUND OF THE INVENTION

This invention relates generally to vacuum insulated containers. More specifically, it relates to improvements in the means for sealing such containers after evacuation and to improvements in the manufacture of such containers.

Vacuum insulated containers variously known as vacuum or thermos bottles or Dewar flasks have been in use for a substantial number of years to provide thermal insulation for various materials desired to be held at or near a particular temperature for prolonged periods of time. Such containers consist of a double-walled receptacle formed of either metal or glass with the space between the walls being evacuated so as to provide the best possible vacuum in that space. Because the vacuum or substantial vacuum in that space is a very poor conductor of heat, there is consequently a minimum of heat loss through the container walls. The performance of such containers is enhanced when the interior surface of the outer wall is coated with a highly reflective material, for instance silver, which retains a very bright reflective surface which does not tarnish or form oxides because of the absence of oxygen in the evacuated space between the walls.

As stated above, such containers may be formed of either metal or glass. Although it is possible that plastics may be used, I am not yet aware of any plastic which is suitable for such purpose when all of the problems, such as desired strength, cost, ease of manufacture and the provision of a truly impermeable wall, are considered. The most commonly used material is glass and the interior surface of the outer wall is commonly coated with silver to provide a reflective surface.

Glass vacuum bottles have been manufactured for a substantial number of years by first positioning a glass tube against the outer wall and by the application of heat bonding that tube to the wall and at the same time piercing a hole through the wall in the area bounded by the tubing. At the completion of these operations a glass tube has been bonded to the wall and encompasses an opening extending into the space between the inner and outer walls. The free end of the tubing is then connected to a vacuum pump which is then operated to evacuate the space between the walls. When the space has been evacuated to the desired degree, the tubing is heated so as to cause it to collapse, closing itself off and thereby seal the now evacuated space between the side walls of the container. The finished product, therefore, consists of the double-walled container with the now sealed glass tubing extending therefrom.

While this structure and method have been successful and continue to be used, there are nevertheless severe disadvantages. One of these disadvantages is that the sealed off tubing extending from the bottle, referred to in the art as the "tubulation," is relatively fragile and when containers of this type are incorporated in devices intended for normal usage means must be provided to protect it. Such means take various forms but usually include a protective cap or cover which encompasses the tubulation and is bonded to the bottle around it. The cap in turn is supported and protected by some kind of resilient or shock absorbing means when the bottle is mounted in a protective jacket to form the so-called vacuum or thermos bottle that is sold for consumer use. The need to provide such protection for the tubulation obviously adds to the cost of manufacture. It in addition requires that the protective jacket be big enough to provide room for it and its protecting means as they may extend from the wall of the bottle as much as three-quarters of an inch.

Another problem with this structure and method occurs during manufacturing. Most commonly, the bottles as described above are manufactured by relatively automatic machinery in which at various stages the operations of flame piercing, tube insertion, tube joining, evacuation and sealing off are performed as a bottle advances from one station to the next. In much of the machinery used for this purpose, a principal support for the bottle being manufactured is provided by the tubulation. It has been found that if the machinery carrying out the described process is operated beyond certain speeds any one bottle in any one position may topple and in doing so fall into adjoining bottles causing them to topple and more than likely breaking, thus causing a production loss with respect to the bottles then in the machine. This imposes an upper limit on the operation of the machine which, as is obvious, precludes optimizing all of the economic benefit to be derived from such automated manufacturing processes.

BRIEF SUMMARY OF THE INVENTION

Therefore, it is an object of this invention to provide a novel vacuum bottle which eliminates the tubulation provided heretofore on such bottles for the purposes of evacuation.

It is another object of this invention to provide a novel vacuum bottle which is less vulnerable to damage while in use and therefore does not require an elaborate protective structure to avoid such damage.

It is another object of this invention to provide a novel vacuum bottle which by eliminating the tubulation permits a reduction in overall dimensions.

It is another object of this invention to provide a novel vacuum bottle which may be manufactured using automatic machinery to achieve production rates higher than those heretofore possible.

It is still another object of this invention to provide a novel method for the manufacture of vacuum bottles which substantially reduces the risk of breakage during manufacture.

It is a further object of this invention to provide a novel method for the manufacture of vacuum bottles which is capable of being carried out at production rates which are measurably higher than those of the prior art.

It is still another object of this invention to provide a novel apparatus for the manufacture of vacuum bottles which may be operated at relatively higher rates of production and with relatively high yields of acceptable finished product.

Briefly, the foregoing and other objects are achieved in one aspect of the invention wherein a vacuum bottle is formed as a double-walled container with the space between the walls being substantially evacuated and the evacuation opening sealed by a compact stopper- or plug-like element bonded in a sealing relationship to the bottle wall. In a further aspect of the invention, the foregoing and other objects are achieved by the provision of a novel method of vacuum bottle manufacture which includes the use of individual sealed chambers and heating means external thereto to evacuate and seal the evacuation opening provided in the bottle. In a still further aspect of the invention, a novel apparatus for the manufacture of vacuum bottles is provided which utilizes a sealed chamber in which a vacuum may be created and in which a bottle or bottles may themselves be evacuated and then sealed.

BRIEF DESCRIPTION OF THE DRAWINGS

The invention itself is set forth in the claims appended hereto and forming a part of this specification while various aspects thereof may be understood by reference to the detailed description taken in conjunction with the accompanying drawings in which:

FIG. 5 is a diagrammatic illustration of the apparatus and a further step in accordance with the invention;

FIG. 5a is an enlarged illustration of the upper portion of the vacuum bottle during the step illustrated in FIG. 5;

FIG. 6 is a view similar to FIG. 5 showing the apparatus and method of the invention at a stage following that of FIG. 5;

FIG. 6a is an enlarged illustration of the upper portion of the vacuum bottle during the step illustrated in FIG. 6;

FIG. 7 is a view similar to FIG. 6 showing the apparatus and method of the invention at a stage following that of FIG. 6;

FIG. 7a is an enlarged illustration of the upper portion of the vacuum bottle during the step illustrated in FIG. 7;

FIG. 8 is a view similar to FIG. 7 showing the apparatus and method of the invention at a stage following that of FIG. 7; and FIG. 8a is a view similar to FIG. 7 showing the apparatus and method of the invention at a stage following that of FIG. 7.

DETAILED DESCRIPTION

Figure 1:
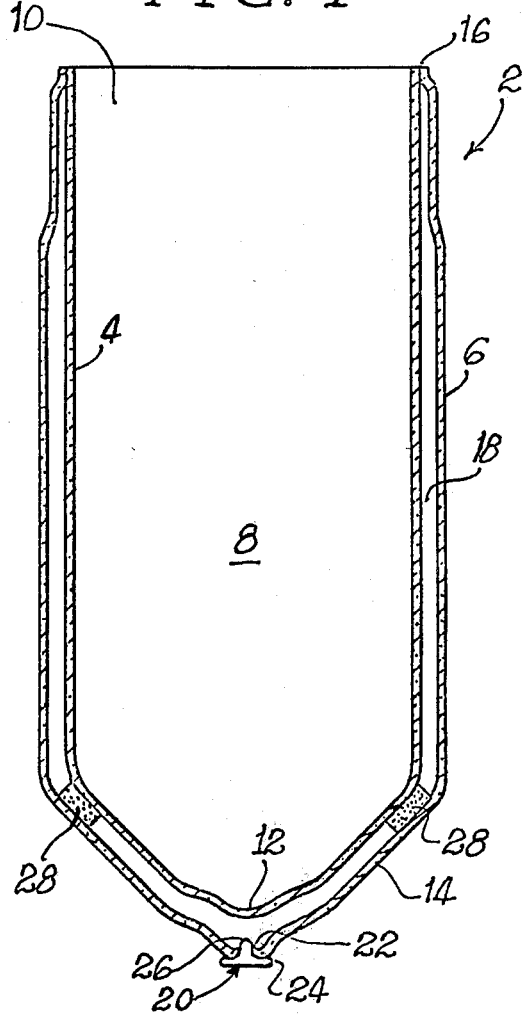
FIG. 1 is a sectional side view of a vacuum bottle in accordance with the invention.
Figure 2:
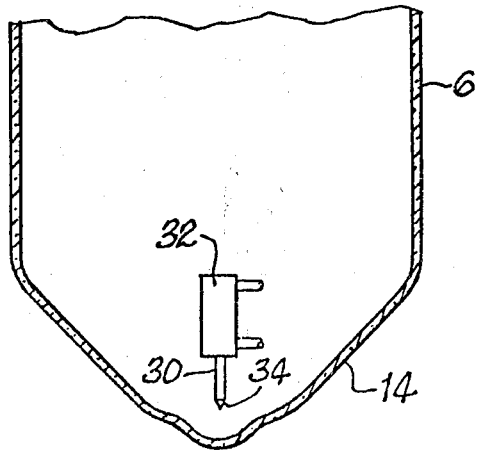
FIG. 2 is a partial view in cross section of a portion of the apparatus and method in accordance with the invention.
Figure 3:
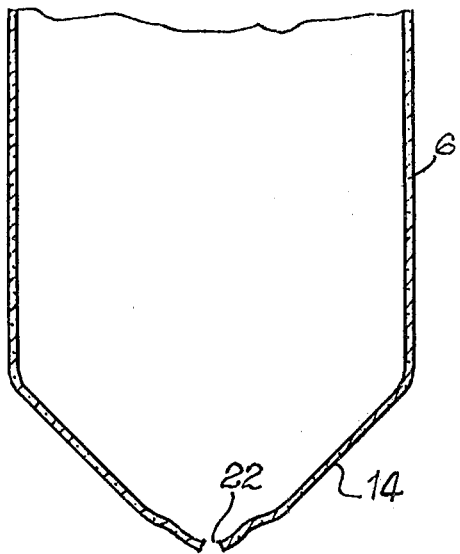
FIG. 3 is a partial side section of the outer wall of a vacuum bottle showing its construction following the operation of the step and apparatus of FIG. 2.

FIG. 1 of the drawing illustrates in longitudinal cross section a vacuum bottle designated generally by reference numeral 2 in accordance with the invention. In the particular embodiment illustrated, the bottle is formed as a substantially cylindrical container having the same diameter throughout its length except for that portion near the bottom. It should be understood, however, that the configuration shown is for purposes of exemplification only as the bottle may be tapered, it may have a wide body and a narrow mouth or the mouth itself may diverge. In other words, the particular shape of the bottle is not critical and may be altered to suit a particular designer's purposes.

The bottle, whatever its shape, is formed with an inner wall 4 and an outer wall 6. The inner and outer walls are concentric throughout most of their length and encompass an interior space 8 for receiving material to be held at a desired temperature. The upper end 10 is open to provide a mouth for access to the space 8. The bottom 12 of the inner wall forms the bottom of the container while the bottom 14 of the outer wall 6 forms the bottom of the bottle.

The inner wall 4 and outer wall 6 are formed as separate elements and bonded together at their upper ends, that is, at the mouth, as is suggested by the seam 16. In the practice of the method of this invention, there are particular advantages in forming the inner wall and outer wall as separate elements and subsequently bonding them, as will be manifest hereinafter.

Continuing with the description of the vacuum bottle of FIG. 1, it is preferred to coat the interior surface of the outer wall 6 with silver so as to provide a reflective surface enhancing the heat retention ability of the bottle. As may be seen, the inner wall 4 and outer wall 6 are spaced from each other and provide therebetween a space 18 which is evacuated in a manner to be described so as to provide a heat insulating vacuum. The vacuum is maintained by virtue of the impermeability of the material out of which the bottle is made and by a plug- or stopper-like element 20 closing an opening 22 in the bottom 14 of the outer wall 6. The plug or stopper seals the opening 22 completely so as to prevent any leakage of air into the vacuum of space 18. The sealing is effected by bonding the plug 20 to the side of the opening 22 and to the outer surface of the bottom 14 in the vicinity of the plug. As may be seen, the plug is provided with a relatively flat head 24 overlying the surface of the bottom 14 encompassing the opening 20 and a stem 26 extends from the relatively flat head 24 and engages the side of the opening 22 in a sealing relationship.

In a preferred embodiment, the inner and outer walls 4 and 6 and plug 20 are made of glass so that the bond at the seam 16 and between the plug and the bottom 14 is achieved by melting the glass at and near these junctures so as to fuse the members together. Thus, in the preferred embodiment, the finished product is in the nature of a unitary structure. However, it is contemplated that materials other than glass may be used so that the bonding at seam 16 and of the plug 20 with the bottom 14 may be achieved in other ways, for instance, a metal such as stainless steel could be used for the inner and outer walls and the seam 16 formed by welding or by the use of a suitable adhesive. The plug could be formed from a different material and its sealing juncture with the bottom 14 achieved in a similar fashion.

The bottle is completed by spacers 28 provided between the bottom 12 and the bottom 14. Spacers may be formed of an inert material or a material such as asbestos which has the ability to perform a so-called "gettering" action, that is, to absorb gas molecules when heated and in this fashion to assist in the maintenance of the vacuum in the space 18.

As may be seen, a vacuum or thermos bottle in which the opening from which the vacuum is drawn is sealed by a flat relatively compact plug rather than the tubular extension of the prior art. Consequently, a relatively fragile component has been eliminated, the overall dimensions have been reduced and there is no need to provide a relatively elaborate and expensive means for protecting a glass tube projecting from the outer wall of the bottle.

In further accordance with the invention, FIGS. 2 through 8 illustrate an apparatus and method for the manufacture of a vacuum bottle such as shown in FIG. 1. It should be understood that the method steps and apparatus of FIGS. 2 through 8 can be done on a continuously operating machine wherein the steps are carried out at different locations or stages in the machine with the components of the bottle being indexed from one stage to the next as each operation is completed. Such a machine could have the various stages in a straight line or the stages could be constituted by stations on the turntable of a circular machine which turntable would be indexed from one station to the next.

At a first station and as a first step in the method, an opening is formed in the bottom 14 of the outer wall 6. This may be done in several ways. However, it is preferred to do it by punching a hole in the bottom. To this end a punch 30 is used. The punch may be actuated by any suitable means such as a fluid piston moving in a cylinder 32 as shown in the drawing. Alternatively, other means such as a cam element may be used. The punch is provided with a pointed tip 34 and by actuating the punch at a controlled rate a hole is punched in the bottom 14 which hole forms the opening 22 shown in FIG. 3. As may be seen in that figure, the opening 22 when formed is frusto-conical in shape. A particular manufacturing advantage is derived subsequently by virtue of this configuration.

After the opening 22 has been formed in the bottom 14, the inner wall is inserted within the outer wall and their upper ends are joined together by fusing them at the seam 16. This may be done by flame welding them if glass or by welding if metal. The structure thus formed, see FIG. 4, is identical to that of FIG. 1 except that the space 18 has not been evacuated nor has the plug 20 been sealed in the opening 22.

FIG. 5 illustrates the apparatus and succeeding step of the invention. At the stage illustrated in this figure, a chamber 36 is provided on a platform or supporting surface 38. The chamber 36 may be removed from the platform 38 to provide access to its interior space 40. Extending into the space 40 encompassed by the walls of the chamber 36 is a piston rod 42 movable in an actuating cylinder 44. The confronting surfaces 46 of the chamber 36 and supporting surface 38 may be constructed in any suitable fashion so as to provide an effective seal when the chamber is resting on the platform. Suitable sealing means 48 are provided around the piston rod 42 so that it may reciprocate in the chamber and, yet at the same time, the atmosphere in the chamber will be maintained. An opening 50 in the side of the chamber receives a hose or other means 52 for connecting the interior 40 of the chamber to the intake of a suction or vacuum pump 53. The upper end of the chamber is provided with a window 54 constructed of a material transparent to infrared radiation. It has been found that quartz or sapphire is satisfactory for this purpose.

Figure 4:
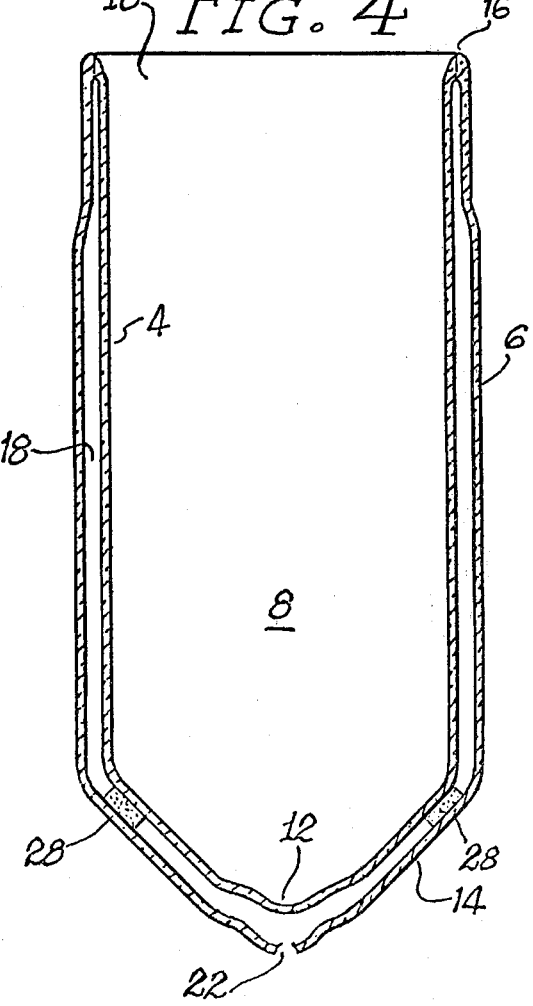
FIG. 4 is a side view in section of the vacuum bottle in accordance with the invention in a further stage in its manufacture.

At the stage illustrated in FIG. 5, with the chamber 36 removed from the supporting surface 38, the vacuum bottle assembled as illustrated in FIG. 4 is placed in an inverted position to rest on a supporting knob 56 on the free end of the piston rod 42. At the same time a ball or bead 58 is placed in the opening 20 and rests against the walls of that frusto-conical opening. The chamber is then placed on the supporting surface 38 with the surface 46 in an air-tight relationship. Fluid is admitted to the cylinder 44 to extend the piston 42 so as to bring the bottle with the bead 58 lying in the opening 20 to a point where the ball is limited in its movement out of the opening 20 by engagement with the undersurface of the window 54. At this point the vacuum pump 53 is operated to draw the air from the chamber space 40 and at the same time from the space 18 between the side walls 4 and 6. When the pump is started, the space 40 and the space 18 are at atmospheric pressure and the initial movement of the air from these spaces is rather violent and the bead 58 loosely mounted in the opening 20 would be drawn out of that opening and perhaps dropped to the bottom of the chamber 36 were it not for the fact that its upward movement is constrained by engagement with the undersurface of the window 54. In a sense, at this stage the bead moves slightly in the manner of a flutter valve to permit air to be drawn from the space 18.

Whereas the illustrated embodiment discloses a fluid cylinder 44 for controlling the movement of the rod 42 it should be appreciated that that movement can be controlled equally well by other mechanical means such as a cam, the surface of which engages the bottom of the rod 42.

As the vacuum increases in the spaces 40 and 18, the gas flow decreases so that the bead 58 simply tends to float in the opening 20.

After the space 40 and particularly the space 18 has been exhausted to a desired degree, the operation advances to the next stage illustrated in FIG. 6. At this stage the piston 42 is retracted slightly and the chamber 36 and its window 54 are now positioned under a heat source such as an infrared lamp 60 mounted in a focusing reflector 62. With the vacuum pump still operating the infrared radiation from the lamp 60 is transmitted through the window 54 and impinges upon the bead 58 and the portion of the bottom 14 encompassing the opening 20. This stage is provided to preheat the ball and the sides of the bottom 14 encompassing the opening 22 and is achieved by providing that the radiation impinging thereon not be sharply focused and that the lamp 60 be of a relatively low power. It has been found that a 1000 watt lamp is satisfactory for this purpose.

After preheating, chamber 36 is advanced to the stage illustrated in FIG. 7. At this stage, a relatively high power infrared source 64, for instance, a 2000 watt lamp, is mounted in a reflector 66 so as to be sharply focused on the bead 58 and the surface of the bottom 14 encompassing the opening 22 so as to melt or soften them. When they have been softened sufficiently, the next step is shown in FIG. 8. This stage may be carried out at the same location as the step illustrated in FIG. 7 or it may be carried out at a next succeeding stage in the machine. With the bead 58 softened as is the surface of the bottom 14 around the opening 22 the piston rod 42 is extended to force the softened bead against the undersurface of the window 54. By this action the bead 58 is deformed and fuses with the material of the bottom to form the stopper 20 with its relatively flat head 24 and stem 26.

After the completion of this stage, the piston 42 is retracted and the chamber 36 may be advanced to a following stage wherein the stopper, the now deformed bead 58, is permitted to cool. Thus, during its stay in the chamber 36 the bottom has been evacuated so that the space 18 is a substantial vacuum and that space has been sealed by the now formed plug or stopper 20. After cooling, the chamber 36 may be opened by lifting it from the supporting surface 38 and the now completed vacuum bottle removed.

It should be understood that the apparatus of the invention may include a plurality of chambers 36 so that at any given time steps in the method of the invention may be carried out on different bottles at succeeding stages. Another advantage is that the use of a plurality of chambers eliminates the failure of one bottle causing a poor vacuum in other bottles in the machine.

A particular advantage of the method and apparatus disclosed is that the bottle at various stages in its manufacture is supported securely on the piston rod 42 and its supporting head 56. As contrasted to the prior art, support for the bottle does not depend to any degree on a connection to a relatively fragile tube extending therefrom. Consequently, it has been found that breakage, when following this method and using the apparatus disclosed, is considerably less than that of the prior art. Because the breakage is less and because the chances of breakage are less it has been found that the apparatus of this invention may be operated at considerably higher speeds than the apparatus of the prior art. In one particular embodiment constructed and in use, production rates of up to 1200 bottles per hour have been achieved and this rate may be contrasted to rates in the range of 400 to 500 bottles per hour of the prior art.

Various changes and modifications of the invention may be made without departing from the scope of the invention as set forth in the claims.

What is claimed as new and desired to be secured by Letters Patent is:

1. Apparatus for the manufacture of double walled vacuum bottles, comprising a sealed chamber; means connected to said chamber for evacuating the air therefrom; means movable vertically in said chamber for supporting a double walled bottle to be evacuated having an opening in one wall of the bottle and a sealing element in the opening; means for causing said vertically moving means to move vertically toward a surface of said chamber to cause said sealing element to engage against said surface to deform said sealing element to cause said sealing element to close the opening in the bottle after the bottle has been evacuated.

2. The apparatus of claim 1 including means for applying heat in the vicinity of the sealing element.

3. The apparatus of claim 2 wherein said heat applying means is external to said chamber.

4. The apparatus of claim 2 wherein said chamber is formed in part by a heat transmitting material.

5. The apparatus of claim 4 wherein said heat applying means is adjacent to the portion of said chamber formed by said heat transmitting material.

6. The apparatus of claim 5 wherein said surface is the surface of the portion of the chamber formed by said heat transmitting material.

* * * * *